US007586716B2

(12) United States Patent
Yamazaki

(10) Patent No.: US 7,586,716 B2
(45) Date of Patent: Sep. 8, 2009

(54) REGULATOR WITH SHUNT OVER-CURRENT BY-PASS

(75) Inventor: Daisuke Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/892,571

(22) Filed: Aug. 24, 2007

(65) Prior Publication Data

US 2007/0290660 A1 Dec. 20, 2007

Related U.S. Application Data

(63) Continuation of application No. PCT/JP2005/003210, filed on Feb. 25, 2005.

(51) Int. Cl.
*H02H 7/00* (2006.01)

(52) U.S. Cl. .......................................... 361/18; 361/56

(58) Field of Classification Search ................. 323/353, 323/349, 350; 361/18, 56; 327/309
See application file for complete search history.

(56) References Cited

U.S. PATENT DOCUMENTS

| | | | | |
|---|---|---|---|---|
| 4,143,313 | A * | 3/1979 | Arendt | 322/28 |
| 4,316,135 | A * | 2/1982 | Rall | 323/265 |
| 4,350,935 | A * | 9/1982 | Spira et al. | 315/291 |
| 4,390,812 | A * | 6/1983 | Seidler | 315/200 A |
| 4,761,722 | A * | 8/1988 | Pruitt | 363/17 |
| 4,914,540 | A * | 4/1990 | Tabata et al. | 361/91.7 |
| 4,975,798 | A * | 12/1990 | Edwards et al. | 361/56 |
| 6,078,204 | A * | 6/2000 | Cooper et al. | 327/309 |
| 6,104,179 | A | 8/2000 | Yukawa | |
| 6,573,693 | B2 | 6/2003 | Okamoto | |
| 6,630,858 | B1 | 10/2003 | Takabayashi | |
| 7,203,045 | B2 * | 4/2007 | Chatty et al. | 361/91.1 |
| 2003/0197598 | A1 | 10/2003 | Hayashi | |

FOREIGN PATENT DOCUMENTS

| | | | |
|---|---|---|---|
| EP | 0 899 934 | A | 3/1999 |
| JP | 10-201088 | | 7/1998 |
| JP | 11 202956 | A | 7/1999 |
| JP | 2000-039923 | | 2/2000 |
| JP | 2001-217689 | | 8/2001 |
| JP | 2002-91584 | A | 3/2002 |
| JP | 2003-296683 | | 10/2003 |

OTHER PUBLICATIONS

Office Action from corresponding Korean Patent Application No. Oct. 2007-7019212, mailed by the KIPO on Jun. 3, 2009.

* cited by examiner

*Primary Examiner*—Shawn Riley
(74) *Attorney, Agent, or Firm*—Fujitsu Patent Center

(57) ABSTRACT

Controlling the supply voltage with high precision irrespective of variations in threshold. A bypass transistor is connected between power supply terminals and provides a bypass path of an excessive current flowing when the supply voltage increases. A resistor is connected between the source of the bypass transistor and the power supply terminal. A bypass control circuit applies a constant voltage to the source of the bypass transistor and also applies a threshold voltage of the bypass transistor between the power supply terminal on the source side and the gate of the bypass transistor.

13 Claims, 12 Drawing Sheets

REGULATOR WITH SHUNT OVER-CURRENT BY-PASS

This application is a continuing application, filed under 35 U.S.C. §111(a), of International Application PCT/JP2005/003210, filed Feb. 25, 2005.

BACKGROUND

1. Field

The embodiment relates to shunt regulators and electronic apparatuses, and particularly to a shunt regulator which controls supply voltage within a given range and an electronic apparatus which operates on power supplied by radio.

2. Description of Related Art

IC cards and ID chips which do not contain a battery as a power source receive radio energy emitted from a reader-writer and obtain power therefrom. The power received by these IC cards and the like changes greatly with the distance from the reader-writer, and the supply voltage also changes greatly. A great increase in supply voltage would result in damage to transistors and the like in the IC card. The IC cards and the like use a shunt regulator or a clamp circuit in order to suppress the great increase in supply voltage (see Japanese Unexamined Patent Application Publication No. 2003-296683 and Japanese Unexamined Patent Application Publication No. 2001-217689, for instance).

FIG. 10 shows a circuit diagram of a conventional shunt regulator. As shown in the diagram, the shunt regulator includes a PMOS transistor M101, resistors R101 and R102, and a capacitor C101.

Power supplied from the reader-writer is rectified by a rectifier and supplied to a load 101. The shunt regulator controls the power (voltage Vdd) rectified by the rectifier within a given range. To be more specific, if a current Iin supplied to the load 101 is excessive, the shunt regulator turns on the transistor M101 to pass a bypass current Ibp and prevents the voltage Vdd from increasing. The bypass current Ibp is designed to be sufficiently small in relation to a current Icons flowing through the load 101 such that, if the current Iin supplied to the load 101 is small and brings the voltage Vdd to the lower limit, the lower limit is obtained with a smaller current Iin.

FIG. 11 is a view illustrating an example of operation of the shunt regulator shown in FIG. 10. As shown in the figure, when the current Iin supplied to the load 101 becomes the current Icons, a voltage Vddmin, which is the lower limit of the voltage Vdd, is obtained. When an increase in the current Iin increases the voltage Vdd, the shunt regulator passes the bypass current Ibp through the transistor M101 to prevent the voltage Vdd from increasing. The shunt regulator controls the voltage Vdd within the range of the voltage Vddmin to a voltage Vddmax by passing the bypass current Ibp to supply an appropriate supply voltage to the load 101. If the current Iin exceeds the current Iin max, the voltage Vdd would exceed the upper-limit voltage Vddmax, disabling the normal operation of the load 101. Otherwise, there would be a possibility that the voltage exceeding the withstand voltage would damage the load 101.

The shunt regulator shown in FIG. 10 passes the bypass current Ibp given by the following expression (1).

$$Ibp = \frac{\beta}{2}\left(Vdd\frac{R101}{R101 + R102} - Vthp\right)^2 \qquad (1)$$

In the expression (1), β is a parameter determined by the characteristics of the transistor M101, such as the gate width and the mobility of electrons, and Vthp is the threshold voltage at which the transistor M101 turns on.

The expression (1) tells that the bypass current Ibp varies with the characteristics of the transistor M101 or the threshold voltage Vthp. Accordingly, the variation in the transistor M101 would affect the bypass current Ibp and change the range of the voltage Vdd.

FIG. 12 is a view showing the relationship between the voltage and the bypass current, affected by the variation in the transistor. A straight line L101 shown in the figure expresses the desired relationship between the voltage Vdd and the bypass current Ibp. The bypass current Ibp should be 0 at the lower-limit voltage Vddmin, and the bypass current Ipb should become the current Iin max at the higher-limit voltage Vddmax.

If the threshold voltage Vthp of the transistor M101 varies, the straight line L101 will slide to the left or right as indicated by an arrowed line P101 in the figure. The variation in β will also change the inclination of the straight line L101, as indicated by arrowed lines P102. Consequently, the variation in the transistor M101 may make it impossible to keep the voltage Vdd within a desired range.

SUMMARY

The embodiment provides that a shunt regulator controlling a supply voltage within a given range, the shunt regulator including a bypass transistor connected between power supply terminals and bypassing an excessive current flowing when the supply voltage increases, and a bypass control circuit applying a constant voltage to the source of the bypass transistor applying a threshold voltage of the bypass transistor between a node of the power supply terminal on the source side and the gate.

DETAILED DESCRIPTION OF THE EMBODIMENTS

A conventional IC card supplied with power by a 13.56 MHz carrier from the reader-writer is not demanded to operate at high speed and can use a high-breakdown-voltage transistor in the rectifier. Therefore, the allowable range of the upper limit (voltage Vddmax) of the voltage Vdd can be widened, depending on the load 101. A UHF-band IC card, however, must rectify power from a carrier having a frequency close to 1 GHz and must use a high-speed transistor in the rectifier, which means that a high-breakdown-voltage transistor cannot be used. This does not allow a great variation in the upper limit of the voltage Vdd and requires a high-precision voltage Vdd.

In view of the foregoing, the embodiment has been made. An object of the embodiment is to provide a shunt regulator and an electronic apparatus that can control supply voltage with high precision irrespective of the variation of an element.

Figure 1:
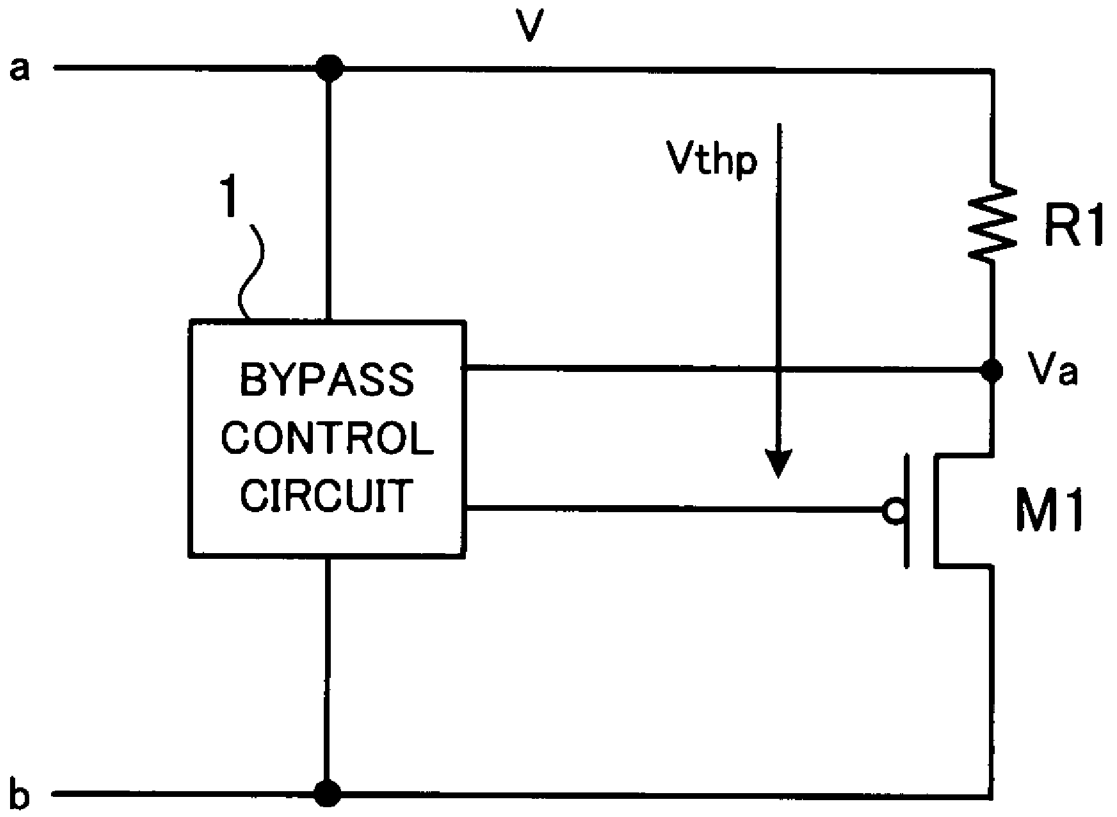
FIG. 1 is a view showing an overview of a shunt regulator.

To solve the above problems, according to the embodiment, there is provided a shunt regulator which controls the supply voltage V within a given range, as shown in FIG. 1. This shunt regulator includes a bypass transistor M1 which is connected between power supply terminals "a" and "b" and provides a bypass path of an excessive current flowing when the supply voltage V increases and a bypass control circuit 1 which applies a constant voltage Va to the source of the bypass transistor M1 and applies a threshold voltage Vthp of the bypass transistor M1 between a node of the power supply terminal "a" on the source side and the gate.

With the shunt regulator, the bypass control circuit 1 applies the constant voltage Va to the source of the bypass transistor M1 and also applies the threshold voltage Vthp of the bypass transistor M1 between the power supply terminal "a" on the source side and the gate. If the supply voltage V exceeds the constant voltage Va applied to the source when the bypass transistor M1 is in a state where it is expected to turn on or off at any moment, the voltage between the power supply terminal "a" on the source side and the gate exceeds the threshold voltage Vthp, and the excessive current is detoured. If the supply voltage V does not exceed the constant voltage Va applied to the source, the voltage between the power supply terminal "a" on the source side and the gate is lower than the threshold voltage Vthp, and the excessive current is not detoured.

In a shunt regulator of the embodiment, the bypass control circuit applies a constant voltage to the source of the bypass transistor and also applies the threshold voltage of the bypass transistor between the power supply terminal on the source side and the gate. This causes an excessive current to be detoured when the supply voltage exceeds the constant voltage, irrespective of the threshold voltage of the bypass transistor. Accordingly, the supply voltage can be controlled with high precision even if the bypass transistors of individual shunt regulators have different threshold voltages.

The above and other objects, features and advantages of the embodiment will become apparent from the following description when taken in conjunction with the accompanying drawings which illustrate preferred embodiments by way of example.

The embodiments will be described in detail with reference to a drawing.

FIG. 1 is a view showing an overview of a shunt regulator. As shown in FIG. 1, the shunt regulator includes a bypass control circuit 1, a resistor R1, and a PMOS bypass transistor M1.

The bypass transistor M1 is connected between power supply terminals "a" and "b" and provides a bypass path of an excessive current flowing when the supply voltage V increases. The resistor R1 is connected between the source of the bypass transistor M1 and the power supply terminal "a".

The bypass control circuit 1 applies a constant voltage Va to the source of the bypass transistor M1 and also applies the threshold voltage Vthp of the bypass transistor M1 between the power supply terminal "a", which is on the source side, and the gate of the bypass transistor M1.

If the supply voltage V equals the constant voltage Va in this circuit, the resistor R1 passes no current. Because the bypass control circuit 1 applies the threshold voltage Vthp between the power supply terminal "a" on the source side and the gate, the bypass transistor M1 is in a state where it is expected to turn on or off at any moment. If the supply voltage V becomes lower than the constant voltage Va in this state, the potential difference between the power supply terminal "a" and the gate becomes smaller than the threshold voltage Vthp, not causing the resistor R1 to pass a bypass current. If the supply voltage V becomes higher than the constant voltage Va, the potential difference between the power supply terminal "a" and the gate becomes greater than the threshold voltage Vthp, causing the resistor R1 to pass a bypass current. The shunt regulator shown in the figure applies the constant voltage Va to the source of the bypass transistor M1, outputs the threshold voltage Vthp causing the bypass transistor M1 to turn on or off to the gate, and provides a bypass path of an excessive current when the supply voltage V exceeds the constant voltage Va applied to the source.

As has been described above, the bypass control circuit 1 applies a constant voltage to the source of the bypass transistor M1 and also applies the threshold voltage Vthp of the bypass transistor M1 between the power supply terminal "a" on the source side and the gate. This causes an excessive current to be detoured when the supply voltage V exceeds the constant voltage Va, irrespective of the threshold voltage Vthp of the bypass transistor M1. Accordingly, the supply voltage V can be controlled with high precision even if the bypass transistors M1 in individual shunt regulators have different threshold voltages Vthp.

One embodiment will next be described in detail with reference to drawings.

Figure 2:
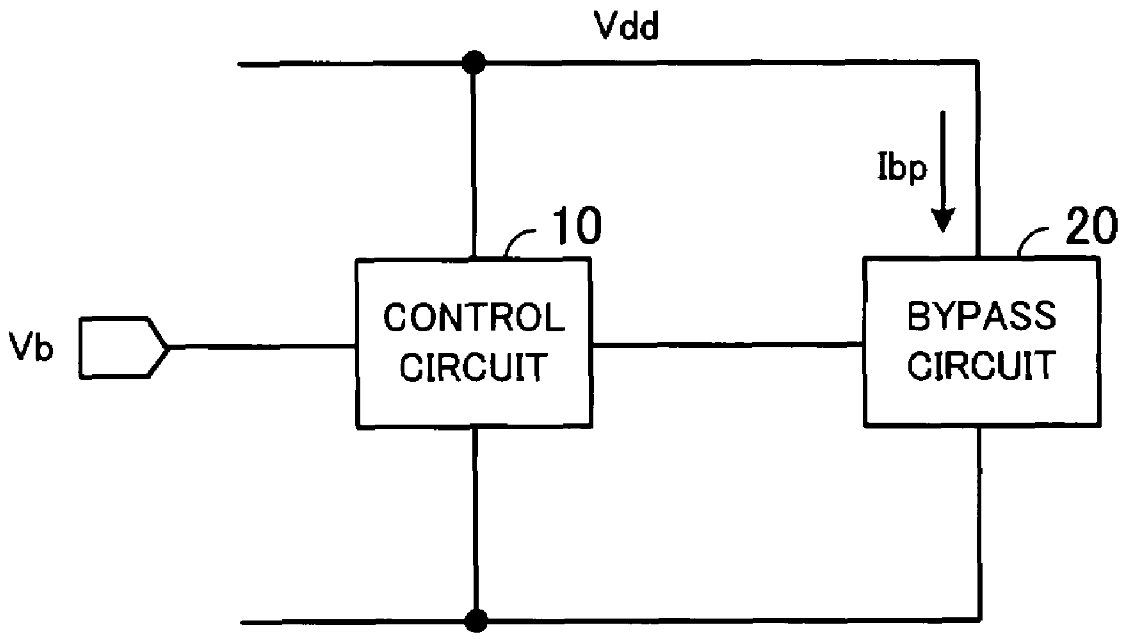
FIG. 2 is a view showing a general structure of a shunt regulator of one embodiment.

FIG. 2 is a view showing a general structure of a shunt regulator of one embodiment. As shown in the figure, the shunt regulator includes a control circuit 10 and a bypass circuit 20. The shunt regulator is formed on a semiconductor chip incorporated in an IC card, for instance. The IC card receives power supplied from a reader-writer and has a rectifier for rectifying the supplied power. The shunt regulator controls the power (voltage Vdd) rectified by the rectifier within a desired range and supplies the power to other circuits.

The control circuit 10 controls the bypass circuit 20 so that the voltage Vdd is kept within a desired range with high precision even if the elements of the bypass circuit 20 have characteristic variations. The control circuit 10 is supplied with a constant reference voltage Vb independent of the supply voltage or temperature, from a band-gap reference (BGR), and controls the bypass circuit 20 on the basis of the reference voltage Vb.

The bypass circuit 20 passes a bypass current Ibp as controlled by the control circuit 10, so that the voltage Vdd of the power supply is kept within a desired range.

The control circuit 10 and the bypass circuit 20 shown in FIG. 2 will next be described in further detail.

Figure 3:
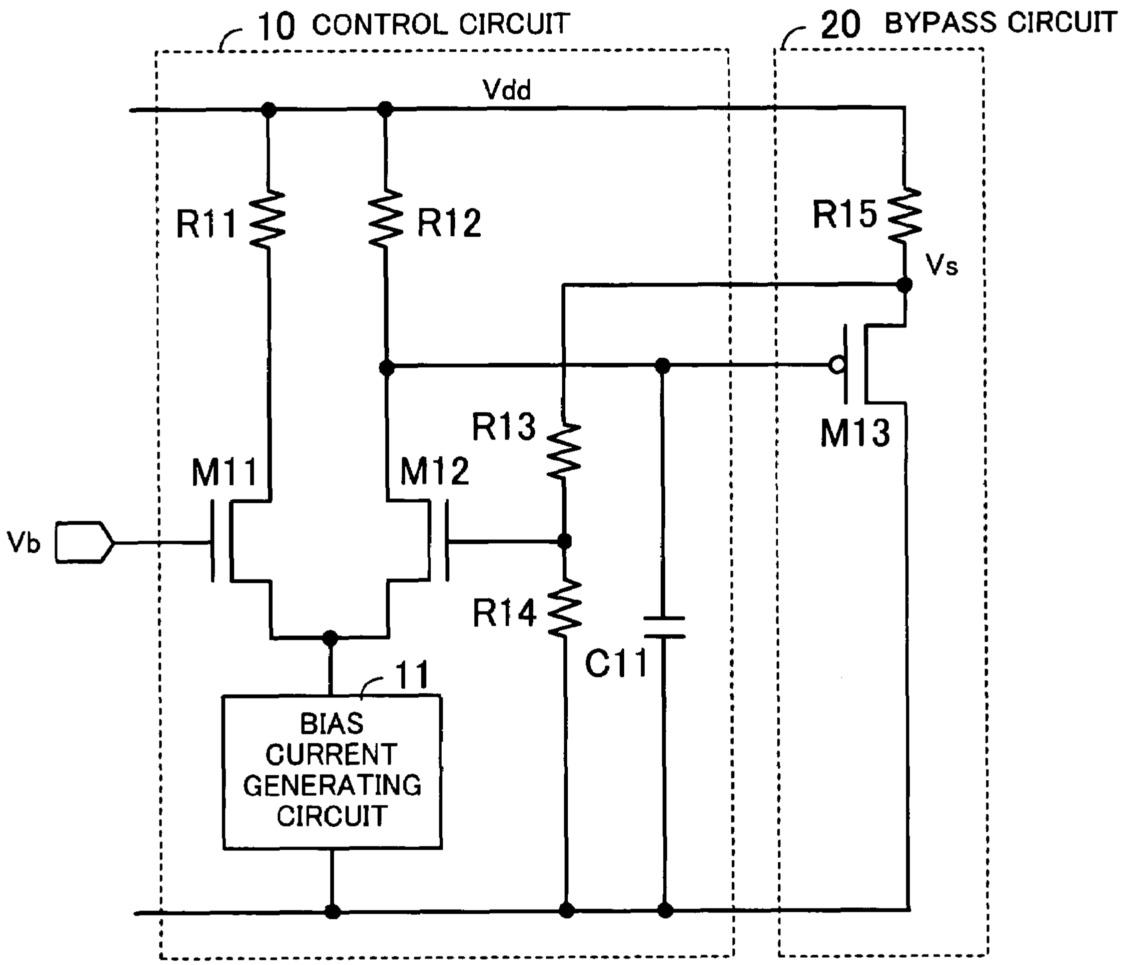
FIG. 3 is a detailed circuit diagram of the shunt regulator shown in FIG. 2.

FIG. 3 is a detailed circuit diagram of the shunt regulator shown in FIG. 2. As shown in the figure, the control circuit 10 includes resistors R11 to R14, NMOS transistors M11 and M12, a capacitor C11, and a bias current generating circuit 11. The bypass circuit 20 includes a resistor R15 and a PMOS transistor M13.

One end of each of the resistors R11 and R12 of the control circuit 10 is connected to the node of the voltage Vdd supplied from the rectifier. The other ends of the resistors R11 and R12 are connected to the drains of the transistors M11 and M12. The sources of the transistors M11 and M12 are connected together to the bias current generating circuit 11. The drain of the transistor M12 is connected to the gate of the transistor M13 of the bypass circuit 20. The gate of the transistor M11 receives the reference voltage Vb from the BGR.

One end of the resistor R13 of the control circuit 10 is connected to the source of the transistor M13 of the bypass circuit 20. The other end of the resistor R13 is connected to an end of the resistor R14. The other end of the resistor R14 is connected to the node of the ground against the voltage Vdd. The node between the resistors R13 and R14 is connected to the gate of the transistor M12. The capacitor C11 is connected between the gate of the transistor M13 of the bypass circuit 20 and the ground.

The source of the transistor M13 of the bypass circuit 20 is connected to one end of the resistor R15. The other end of the resistor R15 is connected to the node of the voltage Vdd. The drain of the transistor M13 is connected to the ground.

The resistors R11 and R12, the transistors M11 and M12, and the bias current generating circuit 11 of the control circuit 10 form a differential circuit. This differential circuit brings the gate voltages of the transistors M11 and M12 to an equal level, with the feedback from the resistors R11, R12, R15, and R13. In other words, the differential circuit sets the gate voltage of the transistor M12 to the reference voltage Vb supplied to the gate of the transistor M11.

The reference voltage Vb is output from the BGR and is kept constant. This causes the gate voltage of the transistor M12 to be constant and the voltage at the node between the resistors R13 and R14 to be constant as well. The source voltage of the transistor M13 of the bypass circuit 20 becomes also constant. The source voltage Vs of the transistor M13 is given by the following expression (2).

$$Vs = \frac{R13 + R14}{R14} Vb \tag{2}$$

As given by the expression (2), the source voltage Vs of the transistor M13 can be determined by the resistors R13 and R14.

The bias current generating circuit 11 feeds bias currents through the transistors M11 and M12 and currents flow through the resistors R11 and R12. The amounts of currents passing the resistors R11 and R12 become equal when the gate voltages of the transistors M11 and M12 become equal in a stable state of the differential circuit. It is assumed that the resistors R11 and R12 have the same resistance. If the bias current generating circuit 11 passes a current 2I, the resistors R11 and R12 pass a current I each.

The bias current generating circuit 11 feeds current in such a manner that the threshold voltage Vthp of the transistor M13 is applied to the resistor R12, as will be described later. That is, in comparison with the node of the voltage Vdd, the gate of the transistor M13 is supplied with the voltage lowered by subtracting the threshold voltage Vthp of the transistor M13. If the voltage Vdd equals the voltage Vs applied to the source, the resistor R15 passes no current. At that time, the transistor M13 is in a state where it is expected to turn on or off at any moment because the voltage lower than the voltage Vs applied to the source of the transistor M13 by the threshold voltage Vthp is biased to the gate. Accordingly, if the voltage Vdd exceeds the voltage Vs applied to the source, the potential difference between the node of the voltage Vdd and the gate of the transistor M13 becomes greater than the threshold voltage Vthp, causing the resistor R15 and the transistor M13 to pass a bypass current. If the voltage Vdd is lower than the voltage Vs applied to the source of the transistor M13, the potential difference between the node of the voltage Vdd and the gate of the transistor M13 becomes smaller than the threshold voltage Vthp, not causing the resistor R15 and the transistor M13 to pass a bypass current.

The supply voltage can be controlled with high precision irrespective of variations in temperature or threshold voltage Vthp, by applying the constant voltage Vs to the source of the transistor M13 of the bypass circuit 20 and biasing the threshold voltage Vthp to the gate.

The bias current generating circuit 11 shown in FIG. 3 will next be described in further detail.

Figure 4:
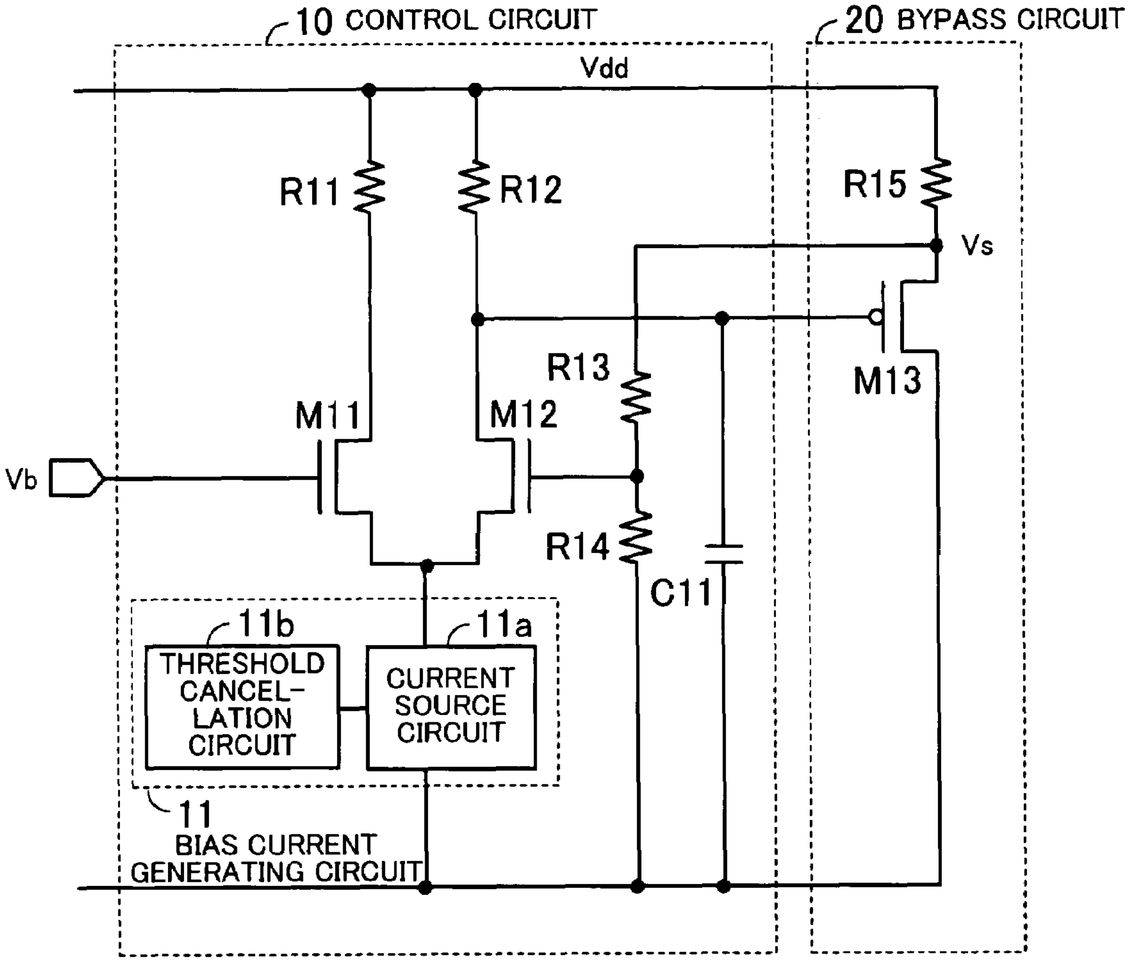
FIG. 4 is a view showing a schematic structure of a bias current generating circuit.

FIG. 4 is a view showing a schematic structure of the bias current generating circuit. In FIG. 4, the same elements as shown in FIG. 3 are denoted by the identical symbols, and a description of those elements will be omitted. As shown in the figure, the bias current generating circuit 11 includes a current source circuit 11*a* and a threshold cancellation circuit 11*b*.

The current source circuit 11*a* feeds bias currents to the transistors M11 and M12 and currents flow through the resistors R11 and R12. The threshold cancellation circuit 11*b* controls the currents of the current source circuit 11*a* so that the threshold voltage Vthp of the transistor M13 is applied to the resistor R12.

Figure 5:
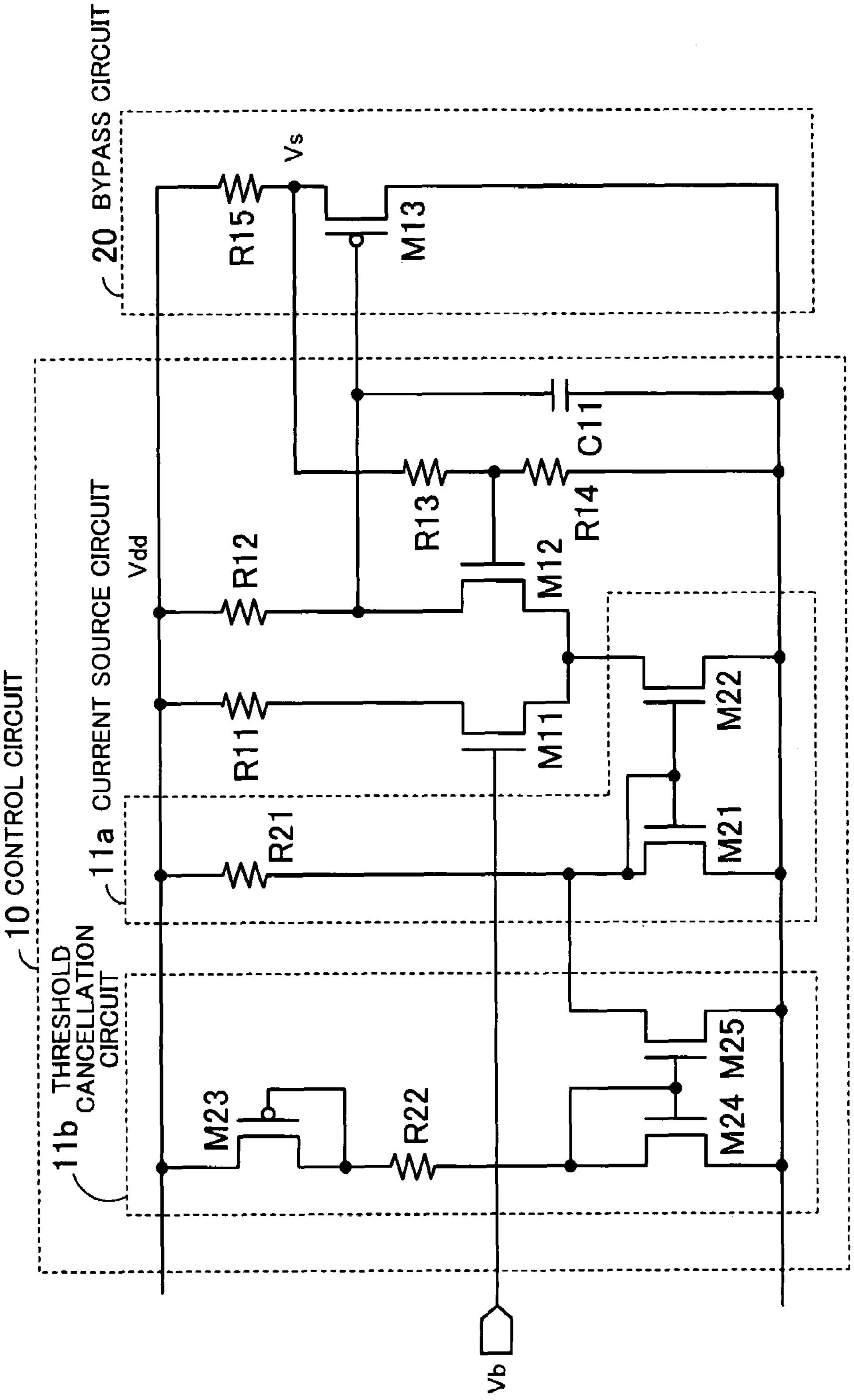
FIG. 5 is a circuit diagram showing details of a current source circuit and a threshold cancellation circuit shown in FIG. 4.

FIG. 5 is a circuit diagram showing details of the current source circuit and the threshold cancellation circuit shown in FIG. 4. In FIG. 5, the same elements as shown in FIG. 4 are denoted by the identical symbols, and a description of those elements will be omitted. As shown in the figure, the current source circuit 11*a* includes a resistor R21 and NMOS transistors M21 and M22. The threshold cancellation circuit 11*b* includes a resistor R22, a PMOS transistor M23, and NMOS transistors M24 and M25.

One end of the resistor R21 of the current source circuit 11*a* is connected to the node of the voltage Vdd supplied from the rectifier. The other end of the resistor R21 is connected to the drain of the transistor M21. The gates of the transistors M21 and M22 are connected together to the drain of the transistor M21. The sources of the transistors M21 and M22 are connected to the node of the ground against the voltage Vdd, and the drain of the transistor M22 is connected to the sources of the transistors M11 and M12. The transistors M21 and M22 form a current source, feeding double the current passing through the transistor M21 to the transistor M22.

The source of the transistor M23 of the threshold cancellation circuit 11*b* is connected to the node of the voltage Vdd supplied from the rectifier. The gate and drain of the transistor M23 are connected together to one end of the resistor R22. The other end of the resistor R22 is connected to the drain of the transistor M24. The gates of the transistors M24 and M25 are connected together to the drain of the transistor M24. The sources of the transistors M24 and M25 are connected the node of the ground against the voltage Vdd, and the drain of the transistor M25 is connected to the drain of the transistor M21. The threshold cancellation circuit 11*b* forms a current mirror circuit and makes the same current as the current passing the transistor M23 and the resistor R22 flow through the transistor M25.

Figure 6:
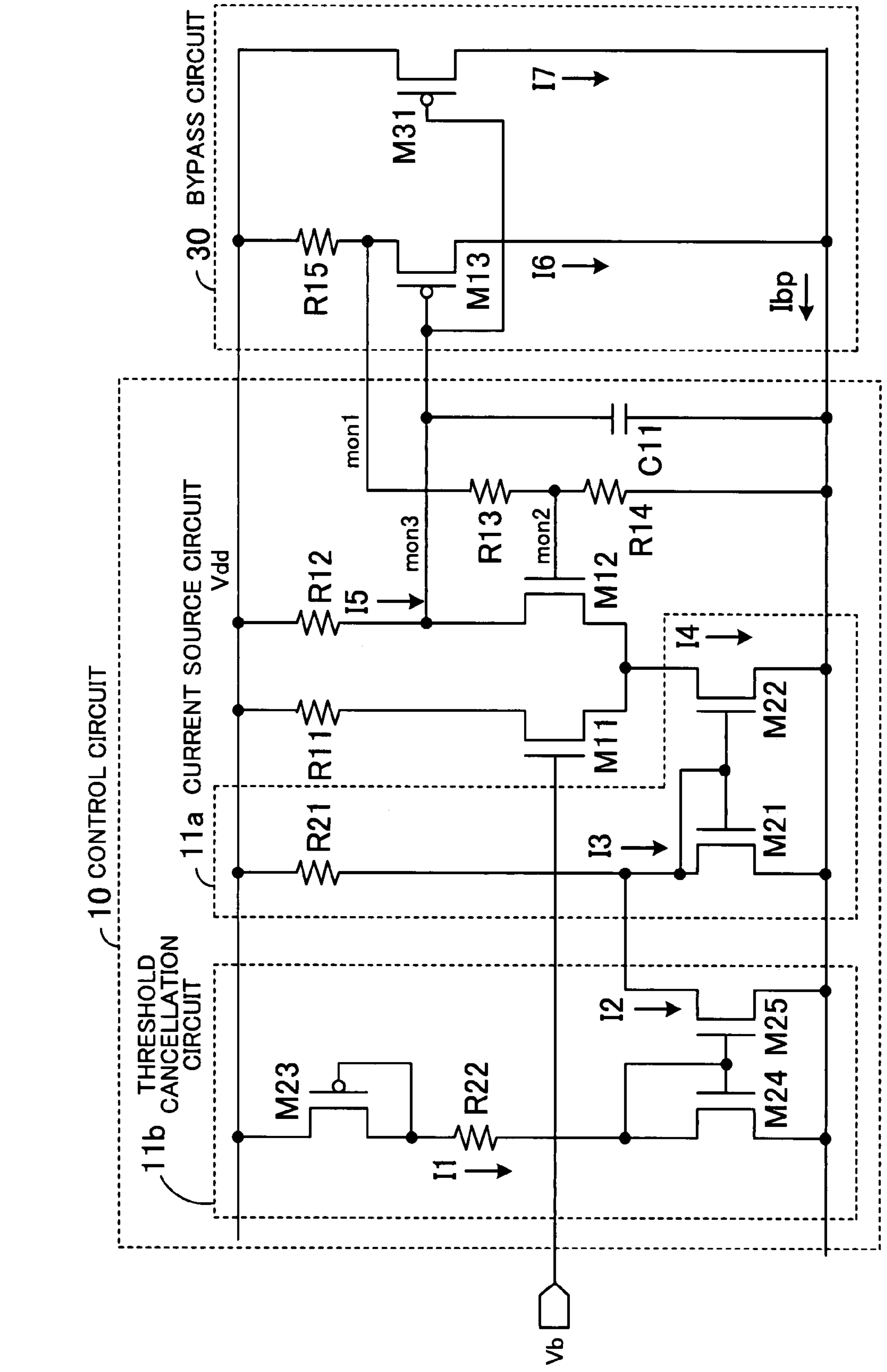
FIG. 6 is a view showing a general structure of a shunt regulator of another embodiment.

The threshold cancellation circuit 11*b* decreases the current passing the resistor R21 of the current source circuit 11*a* by the current passing the transistor M25 to cause the current passing the transistor M22, or the current passing the resistor R12 to generate the threshold voltage Vthp of the transistor M13, by the voltage drop by the resistor R12 (this will be proved by another embodiment of FIG. 6). It is assumed that the transistors M21, M22, M24, and M25 have the same characteristics; the transistors M23 and M13 have the same characteristics; and the resistors R11, R12, R21, and R22 have the same characteristics. These elements are formed nearby on a semiconductor chip, for instance, and are made to have the same characteristics.

The threshold cancellation circuit 11*b* causes the potential difference across the resistor R12 to generate the threshold voltage Vthp of the transistor M13 by controlling the current passing the current source circuit 11*a*, irrespective of the variations in the threshold of the transistor M13 and the resistor R12. Therefore, individual shunt regulators can output the voltage Vdd in the same range irrespective of the variations in the threshold voltage Vthp of the transistor M13 and the resistance of the resistor R12.

The operation of the capacitor C11 will next be described. When the IC card becomes close to the reader-writer and receives power, the rising edge of the reference voltage Vb of the BGR is slower than the rising edge of the voltage Vdd output from the rectifier. In addition, the differential circuit has a low operation response speed because of its power saving. Consequently, the high voltage Vdd may be supplied to the circuits before the differential circuit, which receives the reference voltage Vb, starts. The capacitor C11 prevents the high voltage Vdd from being supplied to the circuits.

The capacitor C11 also slows the rise of the gate voltage of the transistor M13 even if the voltage Vdd increases rapidly. While the gate voltage of the transistor M13 is low, the voltage Vdd does not exceed the sum (Vg+Vthp) of the gate voltage of the transistor M13 and the threshold voltage of the transistor M13. This prevents the high voltage Vdd from being supplied to the circuits. The rise time of the gate voltage of the transistor M13 depends on the time constant determined by the capacitance of the capacitor C11 and the resistance of the resistor R12. So, the time constant should be greater than the response time of the reference voltage Vb of the BGR and the response time of the differential circuit.

The constant voltage Vs is applied to the source of the transistor M13, and the threshold voltage Vthp of the transistor M13 is biased to the gate of the transistor M13. This causes an excessive current to be detoured when the supply voltage Vdd exceeds the voltage Vs, irrespective of the threshold voltage Vthp of the transistor M13. Therefore, the supply voltage can be controlled with high precision even if individual shunt regulators have the variation in the threshold voltage Vthp of the transistor M13. The variation in threshold voltage Vthp owing to variations in temperature would not affect the high-precision supply-voltage control.

Another embodiment will be described in detail with reference to drawings.

FIG. 6 is a view showing a general structure of a shunt regulator of another embodiment. In FIG. 6, the same elements as shown in FIG. 5 are denoted by the identical symbols, and a description of those elements will be omitted.

A bypass circuit 30 shown in FIG. 6 differs from the bypass circuit 20 shown in FIG. 5. In the bypass circuit 30, a PMOS transistor M31 is connected between the node of the voltage Vdd supplied from the rectifier and the node of the ground against the voltage Vdd. The gate of the transistor M31 is connected to the gate of a transistor M13.

Some applications must pass a high bypass current to keep the voltage Vdd within a given range. In those applications, the mutual conductance (gm) of the transistor M13 must be increased to increase the gain. However, the source of the transistor M13 is connected to a resistor R15, and the resistor R15 has the effect of decreasing the gm value of the transistor M13. The gm value of the transistor M13 should be increased in consideration of the gm value decreased by the resistor R15, and the size of the transistor M13 should be increased accordingly. Another transistor M31 is provided to suppress the scale-up of the transistor M13.

With the transistor M31, the gain of the bypass circuit 30 can be increased, and the excessive scale-up of the transistor M13 can be suppressed.

What follows is a description of a threshold cancellation circuit 11*b* which controls the current passing a current source circuit 11*a* and sets the voltage applied to a resistor R12 to the threshold voltage Vthp of the transistor M13. As shown in FIG. 6, the current passing a resistor R22 and transistors M23 and M24 in the threshold cancellation circuit 11*b* is referred to as a current I1, and the current passing a transistor M25 is referred to as a current I2. The current passing a transistor M21 in the current source circuit 11*a* is referred to as a current I3, and the current passing the transistor M22 is referred to as a current I4. The current passing the resistor R12 forming the differential circuit is referred to as a current I5. The current passing the drain of the transistor M13 of the bypass circuit 30 is referred to as a current I6, the current passing the drain of the transistor M31 is referred to as a current I7, and the total current of the currents I6 and I7 is referred to as a bypass current Ibp. It is assumed that the transistors M21, M22, M24, and M25 have the same characteristics, and their threshold voltage is referred to as the threshold voltage Vthn; the transistors M23 and M13 have the same characteristics, and their threshold voltage is denoted by Vthp; and the resistors R11, R12, R21, and R22 have the same characteristics and have the same resistance. The source voltage of the transistor M13 is denoted by mon1, the gate voltage of the transistor M12 is denoted by mon2, and the gate voltage of the transistor M13 is denoted by mon3.

The voltage applied to the resistor R22 is Vdd−Vthp−Vthn, so the current I is given by the following expression (3).

$$I1 = \frac{Vdd - Vthp - Vthn}{R22} \tag{3}$$

The current I3 is obtained by subtracting the current I2 from the current passing the resistor R21. Because the voltage applied to the resistor R21 is Vdd−Vthn, the current passing the resistor R21 is (Vdd−Vthn)/R21. The current I2 equals the current I1 because of the current mirror circuit of the transistors M24 and M25. Therefore, the current I3 is given by the following expression (4).

$$I3 = \frac{Vdd - Vthn}{R21} - \frac{Vdd - Vthp - Vthn}{R22} \quad (4)$$

The current I4 passing the transistor M22 of the current source circuit 11*a* is designed to be double the current I3 passing the transistor M21. Therefore, the current I4 is expressed as I4=2*I3.

When the differential circuit is stabilized, or when the gate voltages of the transistors M11 and M12 become equal, the current I5 becomes a half of the current I4 (because the resistors R11 and R12 have the same resistance, and the resistor R11 also passes the current I5). That is, the current I5 becomes equal to the current I3. Then, the voltage Vdd−mon3 applied to the resistor R12 is given by the following expression (5).

$$Vdd - mon3 = R12 * I3 \quad (5)$$

$$= R12\left(\frac{Vdd - Vthn}{R21} - \frac{Vdd - Vthp - Vthn}{R22}\right)$$

Since the resistors R11, R12, R21, and R22 have the same resistance, the expression (5) can be changed to the following expression (6).

$$Vdd - mon3 = (Vdd - Vthn) - (Vdd - Vthp - Vthn) = Vthp \quad (6)$$

As given by the expression (6), the voltage applied to the resistor R12 is the threshold voltage Vthp of the transistor M13. This means that the voltage between the node of the Vdd and the gate of the transistor M13 is the threshold voltage Vthp of the transistor M13, allowing the voltage Vdd to be controlled within a given range with high precision irrespective of variations in the threshold voltage Vthp of the transistor M13 and variations in the resistance of the resistor R12. The voltage Vdd can also be controlled within a given range with high precision irrespective of variations in the threshold voltage Vthp and variations in the resistance depending on temperature.

The bypass current Ibp which is detoured by the bypass circuit 30 will next be described by using specific values. Suppose that the resistors R13 and R14 have a resistance of 1 MΩ, the resistor R15 has a resistance of 1 kΩ, and the reference voltage Vb output from the BGR is 1.2 V. Also suppose that the current that can pass through the transistor M31 is a hundred times greater than that of the transistor M13.

When the differential circuit is stabilized, the gate voltage mon2 of the transistor M12 becomes equal to the gate voltage of the transistor M11, which is 1.2 V. Because the resistance of the resistors R13 and R14 is 1 MΩ, the source voltage mon1 of the transistor M13 becomes 2.4 V.

As given by the expression (6), the voltage Vdd−mon3 becomes the threshold voltage Vthp. Consequently, if the voltage Vdd is lower than 2.4 V, the voltage Vdd−mon3 becomes lower than the threshold voltage Vthp, not allowing the bypass current Ibp to flow. If the voltage Vdd is higher than 2.4 V, the voltage Vdd−mon3 becomes higher than the threshold voltage Vthp, allowing the bypass current Ibp to flow.

When the voltage Vdd is higher than 2.4 V, the current I6 is (Vdd−2.4 V)/1 kΩ. The transistor M31 can pass current a hundred times more than the transistor M13 and is under the same bias condition as the transistor M13, so that the current I7 is 100*(Vdd−2.4 V)/1 kΩ. The bypass current Ibp is the sum of the currents I6 and I7, which is 101*(Vdd−2.4 V)/1 kΩ. If the voltage Vdd is 2.7 V, for instance, Ibp=101*(2.7 V−2.4 V)/1 kΩ=30.3 mA, and the excessive current from the rectifier is detoured. The design described above shows that a resistor having a resistance of 1/100 of 1 kΩ, or 10Ω, should be connected to the source of the transistor M31 of the bypass circuit 30, but the resistor is eliminated to pass the bypass current Ibp of 30 mA at the voltage Vdd of 2.7 V in consideration of the variation of the transistor M31.

The rising edge of the voltage Vdd will next be described. The rising edge of the reference voltage Vb output from the BGR is slower than the rising edge of the voltage Vdd, as has been described earlier. In addition, the differential circuit has a low response speed because of its power saving. The differential circuit takes a response time of about 4 μs, for instance. If a current of 30 mA is instantaneously output from the rectifier when the IC card becomes close to the reader-writer, the voltage between the voltages Vdd and Vss would increase to the value given by the following expression (7) during the 4-μs response time of the differential circuit. Suppose that a 1-nF bypass capacitor is provided between the voltages Vdd and Vss.

$$Q/C = (30\ mA * 4\mu)/1\ nF = 120V \quad (7)$$

In order to prevent the high voltage as given above from being applied to the circuits, the capacitor C11 causes the bypass circuit 30 to operate earlier than the differential circuit. Even if the voltage Vdd rises rapidly, the capacitor C11 slows down the rise of the gate voltage of the transistor M13. While the gate voltage of the transistor M12 is low, the voltage Vdd does not exceed mon3+Vthp. The rising speed of the voltage mon3 is determined by the capacitor C11 and the resistor R12. If the capacitor C11 has a capacitance of 20 pF and if the resistor R12 has a resistance of 2 MΩ, for instance, the time constant of the capacitor C11 and the resistor R12 is 40 μs. The differential circuit can operate during the period determined by this time constant. The reference voltage Vb of the BGR can rise.

Figure 10:
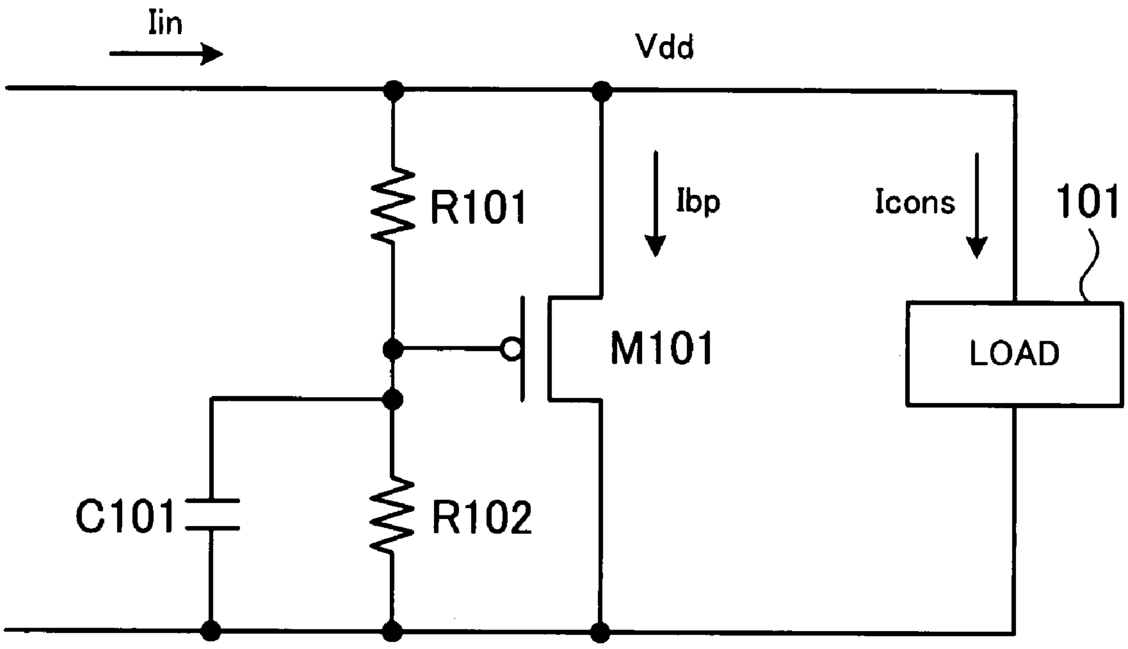
FIG. 10 is a circuit diagram of a conventional shunt regulator.
Figure 11:
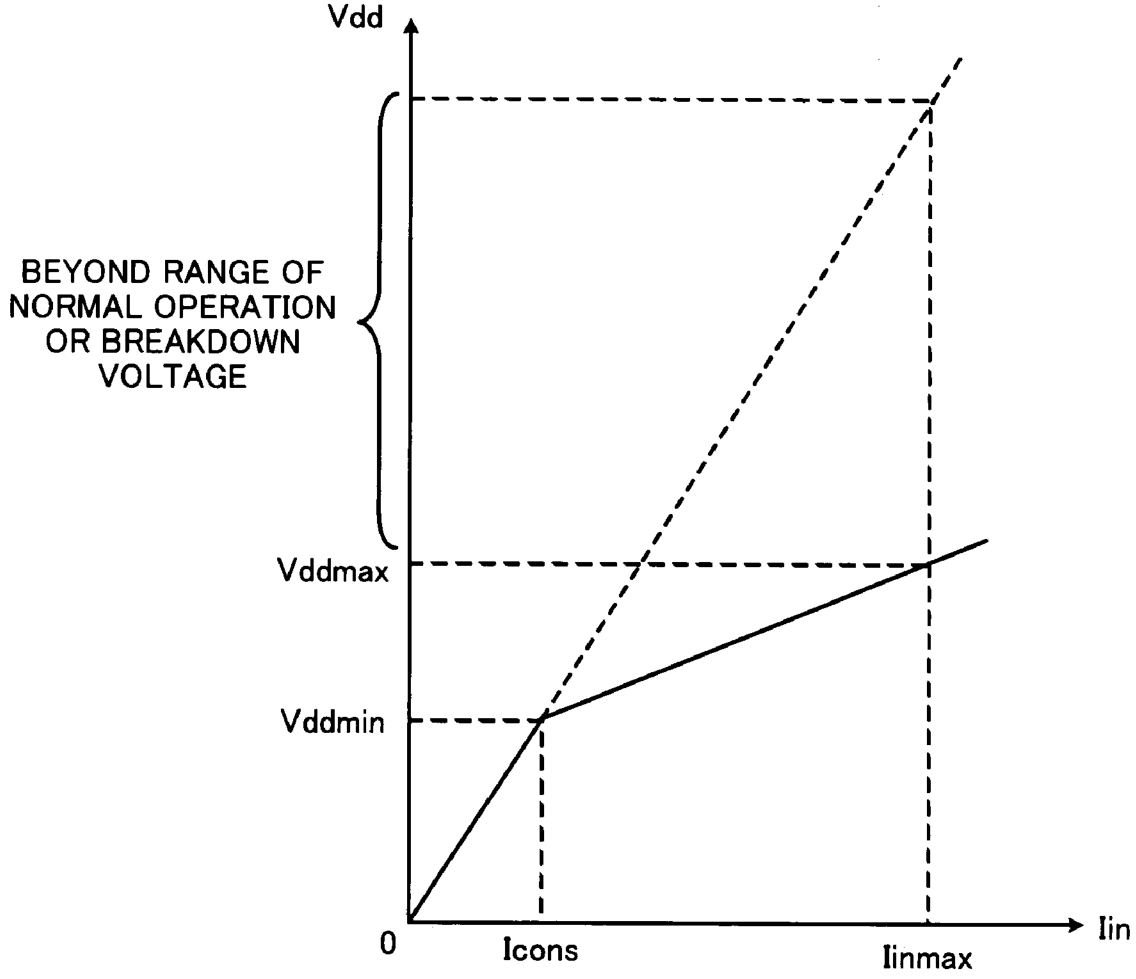
FIG. 11 is a view illustrating an example of operation of the shunt regulator shown in FIG. 10.
Figure 12:
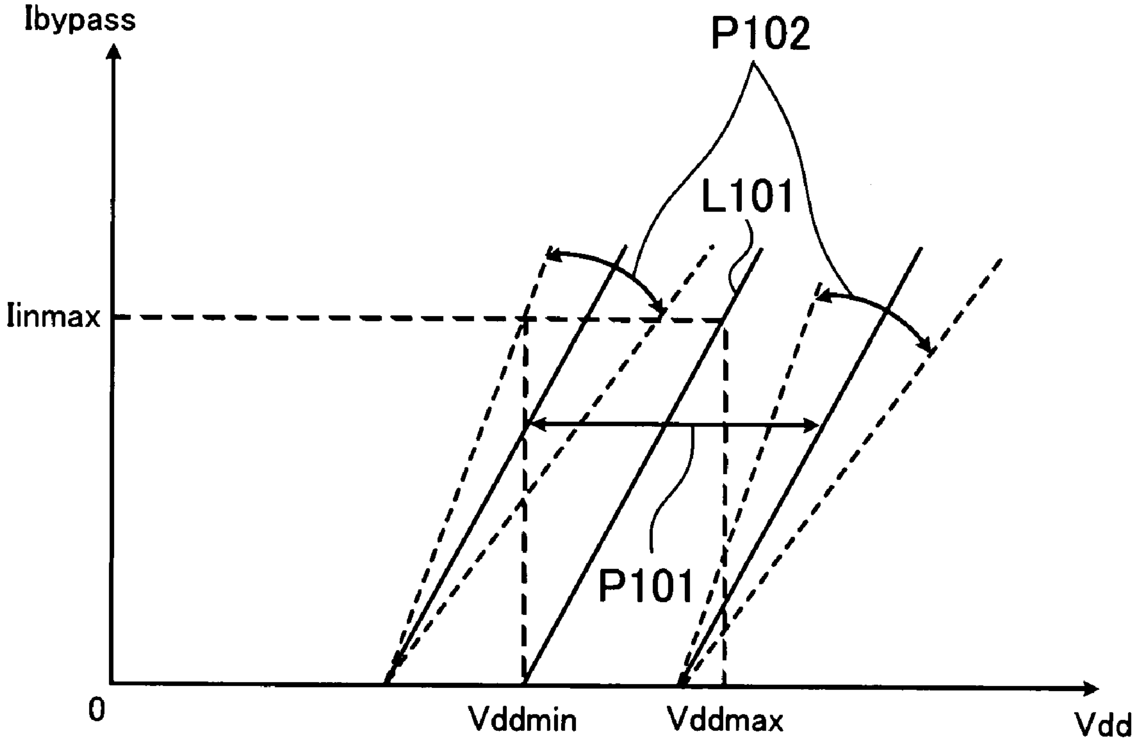
FIG. 12 is a view showing the relationship between the voltage and bypass current, affected by the variation of the transistor.

What follows is a description of the simulation of the voltage Vdd when the threshold voltage Vthp of the transistor M13 in the shunt regulator shown in FIG. 6 and that of the M101 in the shunt regulator shown in FIG. 10 vary.

Figure 7:
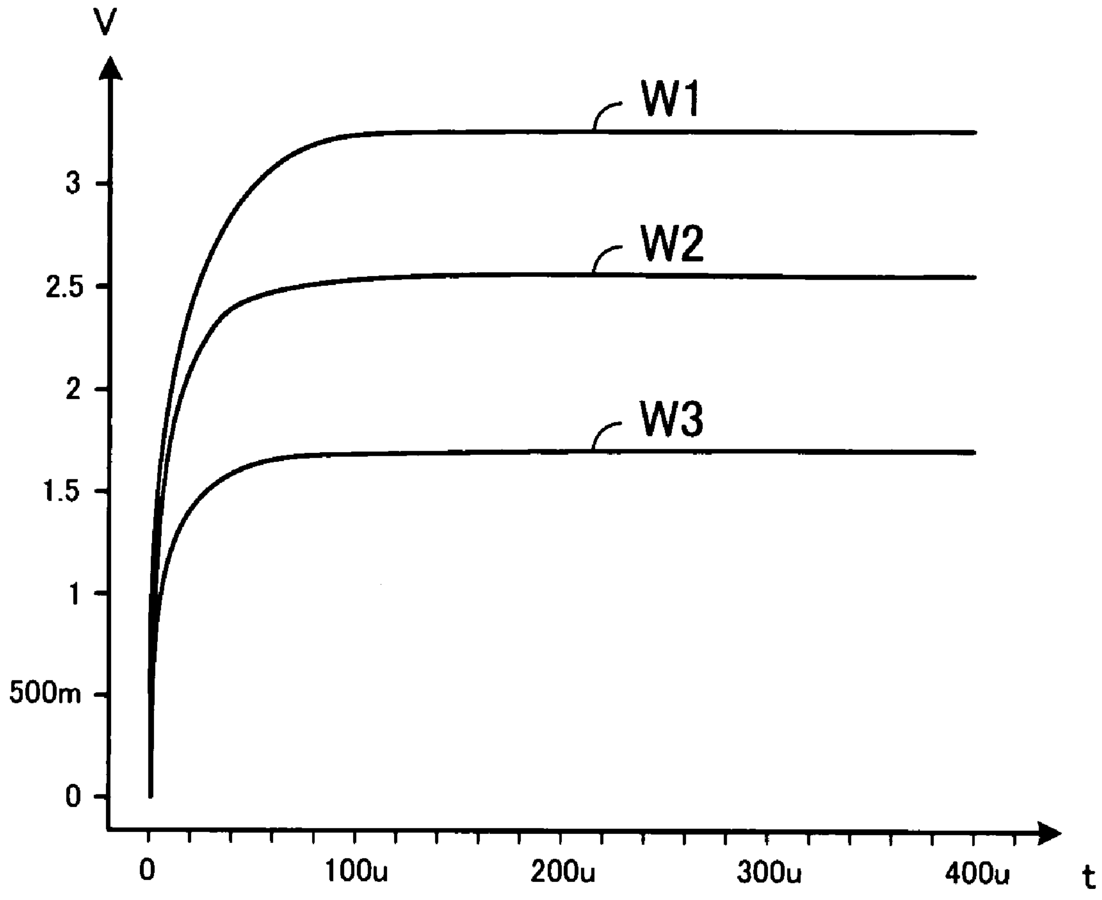
FIG. 7 is a view showing a result of simulation of the shunt regulator shown in FIG. 10.

FIG. 7 is a view showing a result of simulation of the shunt regulator shown in FIG. 10. Waveforms W1 to W3 shown in the figure indicate how the variation in threshold voltage Vthp of the transistor M101 changes the voltage Vdd. The waveform W2 indicates how the voltage Vdd changes with the transistor M101 having the standard threshold voltage Vthp. The waveform W1 indicates how the voltage Vdd changes with the transistor M101 having a threshold voltage Vthp greater than the standard threshold voltage Vthp. The waveform W3 indicates how the voltage Vdd changes with the transistor M101 having a threshold voltage Vthp lower than the standard threshold voltage Vthp.

As shown in the figure, the magnitude of the voltage Vdd depends on the variation in the threshold voltage Vthp of the transistor M101 in the shunt regulator shown in FIG. 10. Therefore, it is hard to use this type of shunt regulator when the voltage Vdd is desired with high precision.

Figure 8:
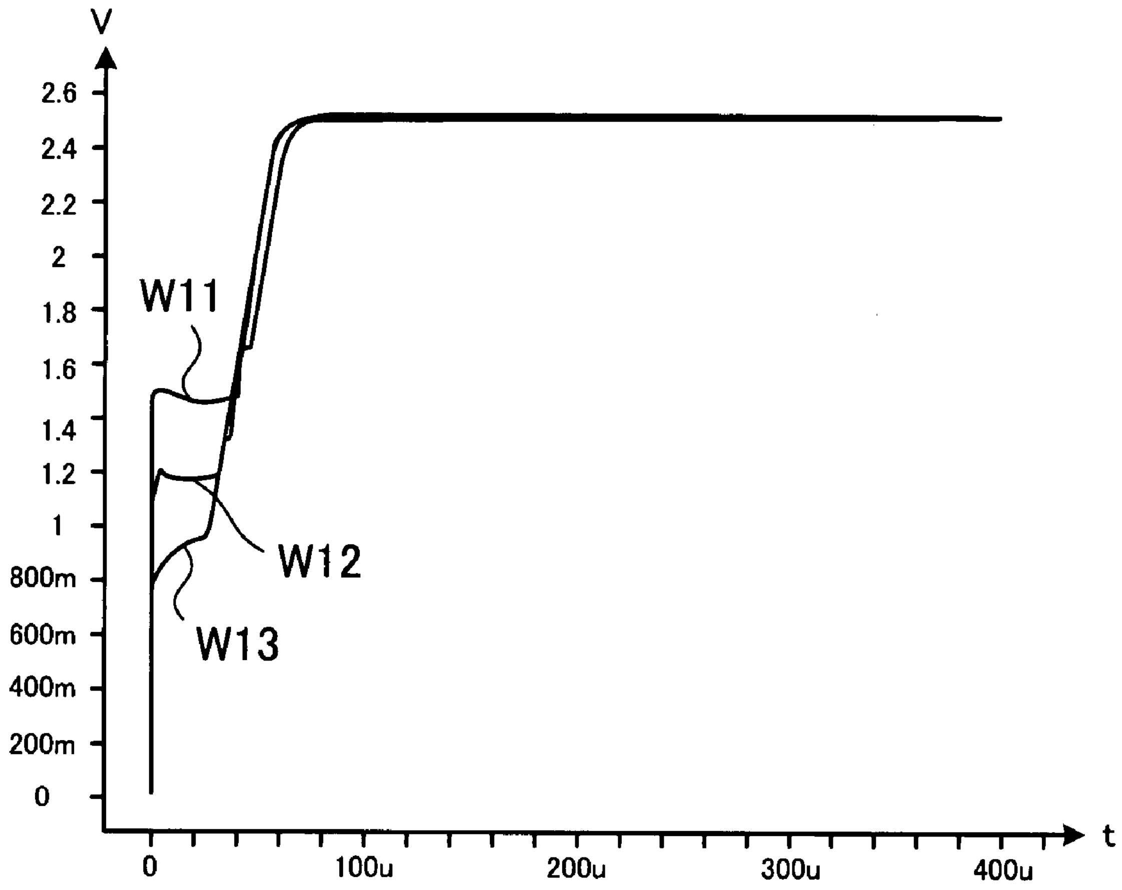
FIG. 8 is a view showing a result of simulation of the shunt regulator shown in FIG. 6.

FIG. 8 is a view showing a result of simulation of the shunt regulator shown in FIG. 6. Waveforms W11 to W13 shown in the figure indicate how the variation in threshold voltage Vthp of the transistor M13 changes the voltage Vdd. The waveform W12 indicates how the voltage Vdd changes with the transistor M13 having the standard threshold voltage Vthp. The waveform W11 indicates how the voltage Vdd changes with the transistor M13 having a threshold voltage higher than the standard threshold voltage Vthp. The waveform W13 indicates how the voltage Vdd changes with the transistor M13 having a threshold voltage lower than the standard threshold voltage Vthp.

As shown in the figure, the shunt regulator shown in FIG. 6 can keep the magnitude of the voltage Vdd almost constant even if the threshold voltage Vthp of the transistor M13 varies. Therefore, this type of shunt regulator can be used when the voltage Vdd is desired with high precision.

Another embodiment will next be described in detail with reference to drawings. In another embodiment, an IC card has the shunt regulator shown in FIG. 5 or 6.

Figure 9:
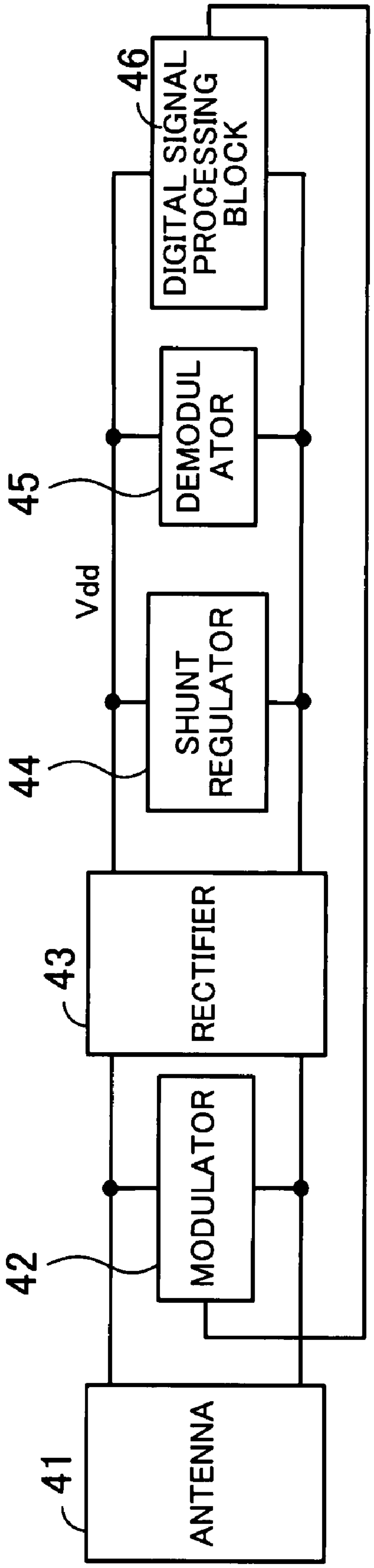
FIG. 9 is a block diagram of an IC card.

FIG. 9 is a block diagram of the IC card. As shown in the figure, the IC card includes an antenna 41, a modulator 42, a rectifier 43, a shunt regulator 44, a demodulator 45, and a digital signal processing block 46.

The antenna 41 exchanges data with the reader-writer. The modulator 42 modulates data processed by the digital signal processing block 46 and sends the data through the antenna 41 to the reader-writer. The rectifier 43 takes high-frequency power from the radio-frequency energy supplied from the reader-writer, converts the power to direct-current power (direct-current voltage), and outputs the power to the modulator 42, the shunt regulator 44, the demodulator 45, and the digital signal processing block 46. The shunt regulator 44 keeps the supply voltage (voltage Vdd) to a constant level. The shunt regulator shown in FIG. 5 or 6 is used as the shunt regulator 44. The digital signal processing block 46 exchanges data with the reader-writer and performs predetermined digital processing.

The power (voltage Vdd) received by the antenna 41 depends on the distance from the reader-writer. If a high voltage is taken from the antenna 41 when the distance between the IC card and the reader-writer is small, the shunt regulator 44 flows a bypass current to supply the constant voltage Vdd to the circuits. The voltage Vdd is also controlled not to exceed the breakdown voltage of a transistor of the rectifier 43.

Since the shunt regulator 44 controls the voltage Vdd with high precision, power can be received from a UHF carrier having a frequency as high as 1 GHz even if a high-breakdown-voltage transistor cannot be used in the rectifier 43.

The IC card has been described above, and ID tags and other apparatuses without internal power supply can also use the shunt regulator shown in FIG. 5 or 6.

The foregoing is considered as illustrative only of the principles of the embodiments. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A shunt regulator controlling a supply voltage within a given range, the shunt regulator comprising:
- a bypass transistor connected between power supply terminals and bypassing an excessive current flowing when the supply voltage increases;
- a bypass control circuit applying a constant voltage to the source of the bypass transistor, and applying a threshold voltage of the bypass transistor between a node of the power supply terminal on the source side and the gate;
- a resistor connected between the node of the power supply terminal on the source side and the gate; and
- a capacitor connected between a node of the power supply terminal on the drain side and the gate.

2. The shunt regulator according to claim 1, wherein the constant voltage is generated on the basis of the voltage of a band-gap reference.

3. The shunt regulator according to claim 1, further comprising a protection circuit turning on the bypass transistor while the supply voltage is rising.

4. The shunt regulator according to claim 1, further comprising a parallel bypass transistor connected between the power supply terminals, and receiving the threshold voltage output from the bypass control circuit at the gate.

5. The shunt regulator according to claim 1, wherein the bypass control circuit comprises:
- a differential circuit receiving a reference voltage and generating the constant voltage on the basis of the reference voltage; and
- a current generating circuit generating a bias current of the differential circuit such that the output voltage of the differential circuit is the threshold voltage.

6. The shunt regulator according to claim 5, wherein the current generating circuit comprises:
- a constant current source; and
- a cancellation circuit generating the bias current by subtracting a given current from the current of the constant current source.

7. The shunt regulator according to claim 6, wherein the cancellation circuit subtracts, by a current mirror structure, a current passing a transistor having the same characteristics as the bypass transistor and a resistor having the same characteristics as the resistor passing the bias current of the differential circuit.

8. An electronic apparatus operating on power supplied by radio, the electronic apparatus comprising:
- a bypass transistor connected between power supply terminals and bypassing an excessive current flowing when a supply voltage increases;
- a bypass control circuit applying a constant voltage to the source of the bypass transistor, and applying a threshold voltage of the bypass transistor between a node of the power supply terminal on the source side and the gate;
- a resistor connected between the node of the power supply terminal on the source side and the gate; and
- a capacitor connected between a node of the power supply terminal on the drain side and the gate.

9. The shunt regulator according to claim 6, wherein the constant voltage is generated on the basis of the voltage of a band-gap reference.

10. The shunt regulator according to claim 6, further comprising a protection circuit turning on the bypass transistor while the supply voltage is rising.

11. The shunt regulator according to claim 6, further comprising a parallel bypass transistor connected between the power supply terminals, and receiving the threshold voltage output from the bypass control circuit at the gate.

12. A shunt regulator controlling a supply voltage within a given range, the shunt regulator comprising:
- a bypass transistor connected between power supply terminals and bypassing an excessive current flowing when the supply voltage increases;
- a bypass control circuit applying a constant voltage to the source of the bypass transistor, and applying a threshold voltage of the bypass transistor between a node of the power supply terminal on the source side and the gate;
- a differential circuit receiving a reference voltage and generating the constant voltage on the basis of the reference voltage; and a current generating circuit for generating a bias current of the differential circuit such that the output voltage of the differential circuit is the threshold voltage, wherein the current generating circuit includes:

a constant current source; and a cancellation circuit generating the bias current by subtracting a given current from the current of the constant current source.

13. The shunt regulator according to claim 12, wherein the cancellation circuit subtract, by a current mirror structure, a current passing a transistor having the same characteristics as the bypass transistor and a resistor having the same characteristics as the resistor passing the bias current of the differential circuit.

* * * * *